US009892077B2

(12) United States Patent
Sengoku

(10) Patent No.: US 9,892,077 B2
(45) Date of Patent: Feb. 13, 2018

(54) CAMERA CONTROL INTERFACE SLAVE DEVICE TO SLAVE DEVICE COMMUNICATION

(71) Applicant: QUALCOMM Incorporated, San Diego, CA (US)

(72) Inventor: Shoichiro Sengoku, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 468 days.

(21) Appl. No.: 14/507,179

(22) Filed: Oct. 6, 2014

(65) Prior Publication Data

US 2015/0100712 A1 Apr. 9, 2015

Related U.S. Application Data

(60) Provisional application No. 61/887,895, filed on Oct. 7, 2013.

(51) Int. Cl.
| | |
|---|---|
| *G06F 13/00* | (2006.01) |
| *G06F 13/36* | (2006.01) |
| *G06F 13/38* | (2006.01) |
| *G06F 13/42* | (2006.01) |
| *G06F 13/40* | (2006.01) |
| *G06F 13/28* | (2006.01) |

(52) U.S. Cl.
CPC .......... *G06F 13/4004* (2013.01); *G06F 13/28* (2013.01); *G06F 13/36* (2013.01); *G06F 13/42* (2013.01)

(58) Field of Classification Search
None
See application file for complete search history.

(56) References Cited

U.S. PATENT DOCUMENTS

| | | | |
|---|---|---|---|
| 6,047,336 A | 4/2000 | Green, III et al. | |
| 7,568,034 B1 * | 7/2009 | Dulitz .................. | G06F 9/5033 709/226 |

(Continued)

FOREIGN PATENT DOCUMENTS

| | | | | |
|---|---|---|---|---|
| WO | WO 9949397 A1 * | 9/1999 | ......... | G06F 13/4213 |
| WO | WO-2009125268 A1 | 10/2009 | | |

OTHER PUBLICATIONS

International Search Report and Written Opinion—PCT/US2014/059477—ISA/EPO—dated Feb. 17, 2015.

*Primary Examiner* — David E Martinez
(74) *Attorney, Agent, or Firm* — Loza & Loza LLP

(57) ABSTRACT

In a shared bus where communications are managed by a master device, direct slave device to slave device (S2S) communications is implemented. A first slave device wanting to communicate with a second slave device may make a S2S communication request to the master device. The request may include a requested number of words that the first slave device wishes to send over the shared bus. The master device may have a current word limit which may vary based upon operating parameters. The master device may deny the request if the requested number of words is greater than the current word limit or if it does not support S2S communications. Denial of the request may also be for other reasons, like activity over the shared bus. If the master device grants the request, the slave device may send the requested number of words to another slave device over the shared bus.

20 Claims, 20 Drawing Sheets

(56) References Cited

U.S. PATENT DOCUMENTS

| | | | |
|---|---|---|---|
| 8,156,274 B2* | 4/2012 | Kapelner | G06F 13/423 710/110 |
| 2006/0206634 A1 | 9/2006 | Torisaki et al. | |
| 2009/0259785 A1* | 10/2009 | Perry | G06F 13/28 710/110 |

* cited by examiner $$\begin{aligned}
\text{Bits} = &\; T_{11} \times 3^{11} \\
&+ T_{10} \times 3^{10} \\
&+ T_9 \times 3^9 \\
&+ T_8 \times 3^8 \\
&+ T_7 \times 3^7 \\
&+ T_6 \times 3^6 \\
&+ T_5 \times 3^5 \\
&+ T_4 \times 3^4 \\
&+ T_3 \times 3^3 \\
&+ T_2 \times 3^2 \\
&+ T_1 \times 3 \\
&+ T_0
\end{aligned}$$

*FIG. 7*

$$T_{11} = \text{Bits} / 3^{11} \quad , \quad M_{11} = \text{Bits} \% 3^{11}$$
$$T_{10} = M_{11} / 3^{10} \quad , \quad M_{10} = M_{11} \% 3^{10}$$
$$T_9 = M_{10} / 3^9 \quad , \quad M_9 = M_{10} \% 3^9$$
$$T_8 = M_9 / 3^8 \quad , \quad M_8 = M_9 \% 3^8$$
$$T_7 = M_8 / 3^7 \quad , \quad M_7 = M_8 \% 3^7$$
$$T_6 = M_7 / 3^6 \quad , \quad M_6 = M_7 \% 3^6$$
$$T_5 = M_6 / 3^5 \quad , \quad M_5 = M_6 \% 3^5$$
$$T_4 = M_5 / 3^4 \quad , \quad M_4 = M_5 \% 3^4$$
$$T_3 = M_4 / 3^3 \quad , \quad M_3 = M_4 \% 3^3$$
$$T_2 = M_3 / 3^2 \quad , \quad M_2 = M_3 \% 3^2$$
$$T_1 = M_2 / 3 \quad , \quad M_1 = M_2 \% 3$$
$$T_0 = M_1$$

*FIG. 8*

$$T_{11} = (\text{Bits} \geq 3^{11} \times 2)\,?\,2 : (\text{Bits} \geq 3^{11})\,?\,1 : 0,\quad M_{11} = \text{Bits} - T_{11} \times 3^{11}$$
$$T_{10} = (M_{11} \geq 3^{10} \times 2)\,?\,2 : (M_{11} \geq 3^{10})\,?\,1 : 0,\quad M_{10} = M_{11} - T_{10} \times 3^{10}$$
$$T_{9} = (M_{10} \geq 3^{9} \times 2)\,?\,2 : (M_{10} \geq 3^{9})\,?\,1 : 0,\quad M_{9} = M_{10} - T_{9} \times 3^{9}$$
$$T_{8} = (M_{9} \geq 3^{8} \times 2)\,?\,2 : (M_{9} \geq 3^{8})\,?\,1 : 0,\quad M_{8} = M_{9} - T_{8} \times 3^{8}$$
$$T_{7} = (M_{8} \geq 3^{7} \times 2)\,?\,2 : (M_{8} \geq 3^{7})\,?\,1 : 0,\quad M_{7} = M_{8} - T_{7} \times 3^{7}$$
$$T_{6} = (M_{7} \geq 3^{6} \times 2)\,?\,2 : (M_{7} \geq 3^{6})\,?\,1 : 0,\quad M_{6} = M_{7} - T_{6} \times 3^{6}$$
$$T_{5} = (M_{6} \geq 3^{5} \times 2)\,?\,2 : (M_{6} \geq 3^{5})\,?\,1 : 0,\quad M_{5} = M_{6} - T_{5} \times 3^{5}$$
$$T_{4} = (M_{5} \geq 3^{4} \times 2)\,?\,2 : (M_{5} \geq 3^{4})\,?\,1 : 0,\quad M_{4} = M_{5} - T_{4} \times 3^{4}$$
$$T_{3} = (M_{4} \geq 3^{3} \times 2)\,?\,2 : (M_{4} \geq 3^{3})\,?\,1 : 0,\quad M_{3} = M_{4} - T_{3} \times 3^{3}$$
$$T_{2} = (M_{3} \geq 3^{2} \times 2)\,?\,2 : (M_{3} \geq 3^{2})\,?\,1 : 0,\quad M_{2} = M_{3} - T_{2} \times 3^{2}$$
$$T_{1} = (M_{2} \geq 3 \times 2)\,?\,2 : (M_{2} \geq 3)\,?\,1 : 0,\quad M_{1} = M_{2} - T_{1} \times 3$$
$$T_{0} = M_{1}$$

*FIG. 9*

EXEMPLARY 20th BIT MAPPING

| Ternary | Bits[19:0] | Address | Write | Read | Bits[i] 19 | 12 | 11 | 9 | 8 | 7 | 6 | 5 | 4 | 3 |
|---|---|---|---|---|---|---|---|---|---|---|---|---|---|---|
| 2222_2222_2222₃ 0x31 (49)↕ | 0xB1BF0 0xB1BC0 | See FIG. 12 | | | 1 | 1 | 1 | 1 | 1 | 1 | 1 | ? | ? | ? |
| 2222_2222_1012₃ [6-bits] 0x40 (64) ↕ | 0xB1BBF 0xB1B80 | | | | 1 | 1 | 1 | 1 | 1 | 1 | 0 | ? | ? | ? |
| 2222_2221_1211₃ [7-bit] 0x80 (128) ↕ 2222_2221_1210₃ | 0xB1B7F 0xB1B00 | Master handover | Reserved | Slave-to-slave request | 1 | 1 | 1 | 1 | 1 | 0 | x | x | x | x |
| 2222_2220_0001₃ [8-bits] 0x100 (256) ↕ 2222_2220_0002₃ | 0xB1AFF 0xB1A00 | Reserved | Reserved | Reserved | 1 | 1 | 1 | 1 | 0 | x | x | x | x | x |
| 2222_2202_2121₃ [9-bits] 0x200 (512) ↕ 2222_2202_2120₃ | 0xB19FF 0xB1800 | Reserved | Slave to slave grant | Slave to slave request | 1 | 1 | 1 | 0 | x | x | x | x | x | x |
| 2222_2112_1121₃ [11-bits] 0x800 (2048) ↕ 2222_2112_1122₃ | 0xB17FF 0xB1000 | CCIe register address | Reserved | Master bus request | 1 | 1 | 0 | x | x | x | x | x | x | x |
| 2222_1121_0202₃ [12-bits] 0x1000 (4096) ↕ 2222_1121_0210₃ | 0xB0FFF 0xB0000 | 8-bit CHK | 8-bit CHK | 8-bit CHK | 1 | 0 | x | x | x | x | x | x | x | x |
| 2221_2201_2001₃ 0x80000 (524288) ↕ 0000_0000_0000₃ | 0x7FFFF 0x00000 | 19-bit data region | | | 0 | x | x | x | x | x | x | x | x | x |

Bit[19] = 1

*FIG. 11*

EXEMPLARY 20th BIT MAPPING

| Ternary | Bits[19:0] | Address | Write | Read | 19:12 | 11 | 10 | 9 | 8 | 7 | 6 | 5 | 4 | 3 | 2 | 1 | 0 |
|---|---|---|---|---|---|---|---|---|---|---|---|---|---|---|---|---|---|
| 2222_2222_2222 | 0x81BF0 | 2SY- | Prohibited | Prohibited | 1 | 1 | 1 | 1 | 1 | 1 | 1 | 1 | 1 | 1 | 0 | 0 | 0 |
| 2222_2222_2221 | 0x81BEF | | | | 1 | 1 | 1 | 1 | 1 | 1 | 1 | 1 | 1 | 0 | 0 | 0 | 1 |
| 0x2A (42) ↓ | | | | | | | | | | | | | | | | | |
| 2222_2222_1102 | 0x81BC6 | Heartbeat v /-NC↓ | | | | | | | | | | | | | | | |
| 2222_2222_1101 | 0x81BC5 | | Prohibited | Prohibited | 1 | 1 | 1 | 1 | 1 | 1 | 0 | 0 | 0 | 1 | 1 | 0 | 1 |
| 2222_2222_1100 | 0x81BC4 | | | | | | | | | | | | | | | | |
| 0x2A (42) ↑ | | | | | | | | | | | | | | | | | |
| 2222_2222_1000 | 0x81BBB | | Reserved | Reserved | | | | | | | | | | | | | |
| 2222_2222_0222 | 0x81BBA | | Reserved | Reserved | | | | | | | | | | | | | |
| 2222_2222_0221 | 0x81BB9 | Reserved | Reserved | Reserved | 1 | 1 | 1 | 1 | 1 | 1 | 0 | 1 | 1 | 1 | 0 | 0 | 1 |
| 2222_2222_0220 | 0x81BB8 | Reserved | Reserved | Reserved | 1 | 1 | 1 | 1 | 1 | 1 | 0 | 1 | 1 | 1 | 0 | 0 | 0 |
| 2222_2222_0212 | 0x81BB7 | Reserved | Reserved | Reserved | 1 | 1 | 1 | 1 | 1 | 0 | 1 | 1 | 0 | 1 | 1 | 1 | 1 |
| [9-bits] 0x8 (8) ↓ | | | | | | | | | | | | | | | | | |
| 2222_2222_0121 | 0x81B80 | | | Reserved | 1 | 1 | 1 | 1 | 1 | 0 | 1 | 1 | 0 | x | x | x | x |
| 2222_2222_0120 | 0x81BAF | | | Reserved | 1 | 1 | 1 | 1 | 1 | 0 | 1 | 0 | 1 | x | x | x | x |
| [4-bits] 0x10 (16) ↓ | | | | | | | | | | | | | | | | | |
| 2222_2222_0000 | 0x81BA0 | | | Reserved | | | | | | | | | | | | | |
| 0xA (10) ↓ | | | | | | | | | | | | | | | | | |
| 2222_2221_2222 | 0x81B9F | | Prohibited | | | | | | | | | | | | | | |
| 2222_2221_2102 | 0x81B90 | Prohibited | SID scan resp | Prohibited | 1 | 1 | 1 | 1 | 1 | 0 | 0 | 0 | 0 | 0 | 0 | 0 | 0 |
| 2222_2221_2101 | 0x81B8F | | Prohibited | | | | | | | | | | | | | | |
| 2222_2221_2100 | 0x81B8E | | | Reserved | | | | | | | | | | | | | |
| [2-bits] 0x4 (4) ↓ | | | | | | | | | | | | | | | | | |
| 2222_2221_2060 | 0x81B85 | Reserved | Reserved | Reserved | 1 | 1 | 1 | 1 | 1 | 0 | 0 | 0 | 0 | 0 | 1 | 0 | 1 |
| 2222_2221_1222 | 0x81B84 | Reserved | Reserved | Reserved | 1 | 1 | 1 | 1 | 1 | 0 | 0 | 0 | 0 | 0 | 1 | 0 | 0 |
| 2222_2221_1221 | 0x81B83 | Reserved | Reserved | Reserved | 1 | 1 | 1 | 1 | 1 | 0 | 0 | 0 | 0 | 0 | 0 | 1 | 1 |
| [2-bits] 0x4 (4) ↑ | | | | | | | | | | | | | | | | | |
| 2222_2221_1211 | 0x81B80 | Reserved | Reserved | Reserved | 1 | 1 | 1 | 1 | 1 | 0 | 0 | 0 | 0 | 0 | x | x | x |

*FIG. 12*

CAMERA CONTROL INTERFACE SLAVE DEVICE TO SLAVE DEVICE COMMUNICATION

CROSS-REFERENCE TO RELATED APPLICATIONS

The present Application for patent claims priority to Provisional Application No. App. No. 61/887,895, entitled "Camera Control Interface Slave Device to Slave Device Communication" filed Oct. 7, 2013, which is assigned to the assignee hereof and hereby expressly incorporated by reference herein.

FIELD

The present disclosure pertains to enabling operations over a shared control data bus and, more particularly, to communication of data from one slave device to another slave device over a multi-wire data and/or clock control data bus.

BACKGROUND

I2C (also referred to as I²C) is a multi-master serial single-ended control data bus used for attaching low-speed peripherals to a motherboard, embedded system, cellphone, or other electronic devices. The I2C control data bus includes a clock (SCL) and data (SDA) lines with 7-bit addressing. The control data bus has two roles for nodes: master and slave. A master node is a node that generates the clock and initiates communication with slave nodes. A slave node is a node that receives the clock and responds when addressed by the master. The I2C control data bus is a multi-master control data bus which means any number of master nodes can be present. Additionally, master and slave roles may be changed between messages. I2C defines basic types of messages, each of which begins with a START and ends with a STOP.

In this context of a camera implementation, unidirectional transmissions may be used to capture an image from a sensor and transmit such image data to memory in a baseband processor, while control data may be exchanged between the baseband processor and the sensor as well as other peripheral devices. In one example, a Camera Control Interface (CCI) protocol may be used for such control data between the baseband processor and the image sensor (and/or one or more slave nodes). In one example, the CCI protocol may be implemented over an I2C serial control data bus between the image sensor and the baseband processor.

Master devices control access to the control data bus. While some slave devices may have the capability of switching to a master mode of operation, other slave devices cannot operate in the master mode. One major distinction between a slave-only slave device versus a master-capable slave device is the ability to receive (e.g., handle) interrupts on an interrupt request line (IRQ). The slave-only slave devices can cause/send interrupts but cannot handle such interrupts. Therefore, because interrupt handling is extremely important, heretofore slave devices cannot communicate directly with other slave devices. Accordingly, it would be desirable to enable slave device to slave device communications over a shared data bus controlled by a master device.

SUMMARY

A master device is provided comprising a bus interface circuit and a processing circuit. The bus interface circuit may serve to couple to a control data bus shared with a plurality of slave devices. The processing circuit may be coupled to the bus interface and configured to: (a) control access to the control data bus by the plurality of slave devices; and/or (b) receive, a slave device to slave device communication request, from a slave device requesting access to the control data bus.

In one example, the slave device to slave device communication request may include a requested number of words to be transferred by the requesting slave device to another slave device.

In another example, the slave device to slave device communication request may include a requested maximum number of words to be transferred from the requesting slave device to another slave device over the control data bus. The processing circuit may be further configured to send, to the requesting slave device, a response granting the request. The response grants the request by including a word limit number in the response that is equal to or greater than a maximum number of words specified in the request. The processing circuit may be further configured to: (a) monitor the control data bus to detect an end of slave device to slave device communications; and/or (b) regain control of the control data bus after an end of slave device to slave device communications is detected.

In yet another example, the slave device to slave device communication request may include a requested maximum number of words to be transferred from the requesting slave device to another slave device over the control data bus. The processing circuit may be further configured to send, to the requesting slave device, a response denying the request. The slave device to slave device communication request may be denied if the requested maximum number of words is greater than a current word limit of the master device. The processing circuit may be further configured to send, to the requesting slave device, a response denying the request by sending an acceptable number of words when a requested maximum number of words provided by the requesting slave device is greater than a current word limit. The master device may also send the response denying the request if the master device does not support slave device to slave device communications.

A method operational by a master device is provided, comprising: (a) controlling access to a control data bus shared with a plurality of slave devices; and/or (b) receiving a slave device to slave device communication request from a slave device requesting access to the control data bus. The slave device to slave device communication request may include a requested maximum number of words to be transferred from the requesting slave device to another slave device over the control data bus.

The method may further comprise: (a) sending, to the requesting slave device, a response granting the request; (b) monitoring the control data bus to detect an end of slave device to slave device communications; and/or (c) regaining control of the control data bus after an end of slave device to slave device communications is detected.

The method may further comprise sending, to the requesting slave device, a response denying the request. In one example, in response to the request denial, the method may further include: (a) receiving a request from the requesting slave device to have the master device transfer a certain amount of information between the requesting slave device and the another slave device; and/or (b) transferring data between the requested information between the requesting slave device and the another slave device. In another example, the response denying the request may include an acceptable number of words that is less than the requested maximum number of words.

A slave device, comprising a bus interface circuit and a processing circuit. The bus interface circuit may serve to couple the slave device to a control data bus shared with a plurality of slave devices and at least one master device. The processing circuit may be coupled to the bus interface circuit and configured to send a slave device to slave device communication request from the slave device to the master device over the control data bus. The communication request may include a requested maximum number of words to be transmitted by the slave device to another slave device over the control data bus.

In one example, the processing circuit may be further configured to receive a response denying the request from the master device. The denial response may include an otherwise acceptable number of words from the master device.

In another approach to a denial response, the processing circuit may be further configured to send a new slave device to slave device communication request to the master device, wherein the new slave device to slave device communication request includes a new requested maximum number of words that is less than or equal to the received acceptable number of words.

In yet another alternative approach to a denial response, the processing circuit may be further configured to send a new request to have the master device transfer a certain amount of information between the requesting slave device and the another slave device.

In yet another alternative approach to a denial response, the processing circuit may be further configured to either: (a) resend the same slave device to slave device communication request, with the same maximum number of words, to the master device at a later time; or (b) send a new slave device to slave device communication request with a second word limit that is less than the previous maximum word limit requested but greater than an acceptable number of words identified by the master device in its denial of the initial request.

In yet another alternative approach to a denial response, the processing circuit may be further configured to: (a) send a master request to the master device to transfer control of the control data bus to the requesting slave device; (b) operate as new master of the control data bus if the master request is granted by the master device; and/or (c) send a desired amount of data words to another slave device.

In another example, the processing circuit may be further configured to: (a) receive a response granting the request; and/or (b) send a slave device to slave device communication to the control data bus.

The slave device to slave device communication may be limited to an acceptable number of words approved by the master device.

According to another aspect, a method operational on a slave device is provided, comprising: (a) coupling the slave device to a control data bus shared with a plurality of slave devices and at least one master device; and/or (b) sending a slave device to slave device communication request from the slave device to the master device over the control data bus. The slave device to slave device communication request may include a requested number of words to be transferred by the slave device to another device over the control data bus. In one example, the method may further comprise: (a) receiving a response granting the request; and/or (b) sending a slave device to slave device communication to the control data bus. The slave device to slave device communication may be limited to an acceptable number of words approved by the master device.

SUMMARY OF FIGURES

Various features, nature, and advantages may become apparent from the detailed description set forth below when taken in conjunction with the drawings in which like reference characters identify correspondingly throughout.

FIG. 7 illustrates a general example of converting a ternary number (base-3 number) to a binary number, where each T in {T11, T10, . . . T2, T1, T0} is a symbol transition number.

FIG. 8 illustrates an exemplary method for converting a binary number (bits) to a 12 digit ternary number (base-3 number).

FIG. 9 illustrates an example of one possible implementation of the division and the modulo operations of FIG. 8, which may be synthesizable by any commercial synthesis tools.

FIG. 11 illustrates that besides the bit 19 being set for numbers 2221_2201_2002$_3$ to 2222_2222_2222$_3$, that range of numbers can be subdivided into six sections.

FIG. 12 illustrates an exemplary mapping of a portion of the Bit 19 mapping of FIG. 11.

DETAILED DESCRIPTION

Figure 1:
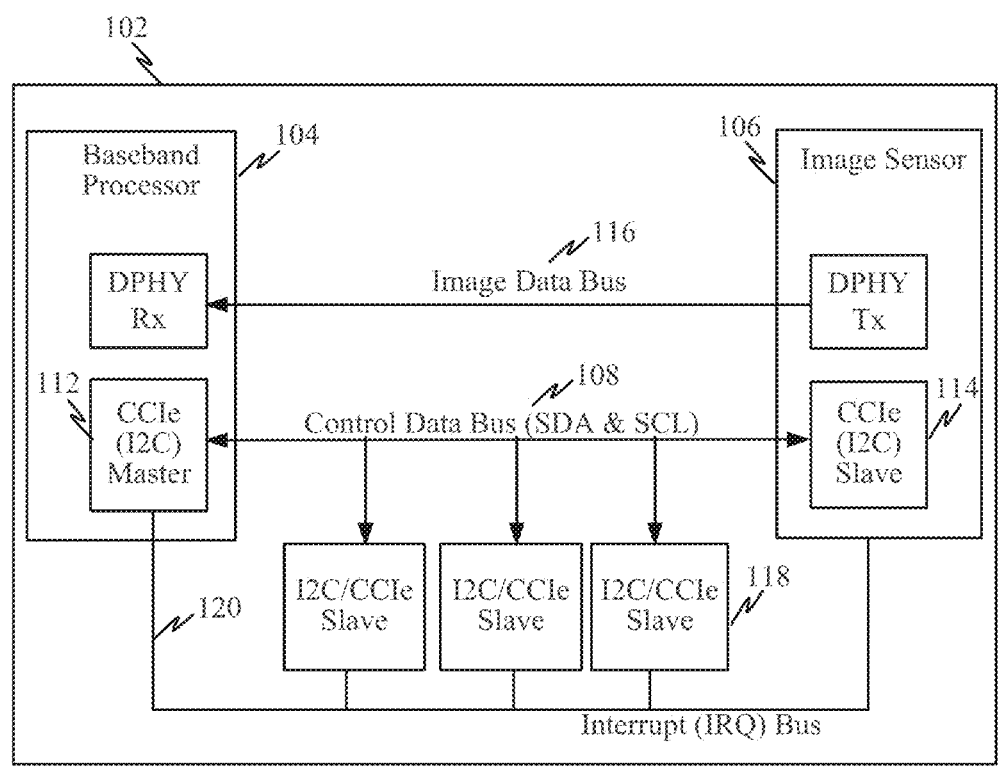
FIG. 1 is a block diagram illustrating an exemplary device having a baseband processor and an image sensor and implementing an image data bus and a multi-mode control data bus.

In the following description, specific details are given to provide a thorough understanding of the embodiments. However, it will be understood by one of ordinary skill in the art that the embodiments may be practiced without these specific detail. For example, circuits may be shown in block diagrams in order not to obscure the embodiments in unnecessary detail. In other instances, well-known circuits, structures, and techniques may not be shown in detail in order not to obscure the embodiments.

Overview

A first feature provides for direct slave device to slave device communications over a shared control data bus managed by a master device. A first slave device wishing to communicate with a second slave device may make a slave device to slave device communication request to the master device. The request may include a requested number of words that the first slave device wishes to send to the second slave device over the shared control data bus managed by the master device. Such communication request may be for a direct transfer (e.g., read or write operations) between the first slave device and the second slave device while bypassing the master device (e.g., the data to be transferred is not managed or sent by the master device). The master device may have a current word limit which may vary based upon operating parameters. For example, the master device may allow different numbers of words to be communicated between the slave devices at different times. For instance, during peak control bus use periods, the slave devices may be limited to communicating with each other using no more than eight word at a time. There may be times when no slave device to slave device communications are allowed (i.e., the current word limit may be zero). Moreover, during periods of low control bus use, the current word limit may be 1024 words, for example. Consequently, the current word limit may be dynamically adjusted by the master device managing the bus and may change over time according to control data bus conditions or for any other desirable reason.

Because the word limit may change dynamically, and a slave device may not know what the current word limit is, a second feature provides for communicating to the salve device the current word limit. For example, the first slave device desiring to communicate with the second slave device sends the slave device to slave device communication request which includes a desired number of words to be communicated to the second slave device. When the desired number of words is greater than the current word limit, the master device sends the first slave device a denial message that includes the current word limit such that the slave can request to send a smaller message to the second slave device. The master device receives this request for a smaller message and sends the first slave device a message granting the request. The first slave device then sends the message to the second slave device. The master device monitors the message(s) being sent from the first slave device to the second slave device. Upon detecting an "end" control code being sent from the first slave device to the second slave device, the master device knows the communication has ended and regains control of the control data bus exactly as the master device had done prior to granting the communication request by the first slave device. Additionally, the master device may continuously monitor the IRQ line while the first slave device is communicating with the second slave device. Any interrupt requests occurring during the slave device to slave device communication is handled once the slave device to slave device communication has ended. In one feature, the current word limit is not only variable based upon control data bus traffic but also on recent frequency of interrupt requests. Consequently, during periods of relatively high interrupt requests, the current word limit may be lower than periods of relatively low interrupt requests.

Exemplary System for Slave Device to Slave Device Communications

FIG. 1 is a block diagram illustrating a device 102 having a baseband processor 104 and an image sensor 106 and implementing an image data bus 116 and a multi-mode control data bus 108 in which slave device to slave device communications may be enabled as described herein. While FIG. 1 illustrates the multi-mode control data bus 108 within a camera device, it should be clear that this control data bus 108 may be implemented in various different devices and/or systems. Image data may be sent from the image sensor 106 to the baseband processor 104 over an image data bus 116 (e.g., a high speed differential DPHY link). In one example, the control data bus 108 may be an I2C control data bus comprising two wires, a clock line (SCL) and a serial data line (SDA). The clock line SCL may be used to synchronize all data transfers over the I2C bus (control data bus 108). The data line SDA and clock line SCL are coupled to all devices 112, 114, and 118 on the I2C bus (control data bus 108). In this example, control data may be exchanged between the baseband processor 104 and the image sensor 106 as well as other peripheral devices 118 via the control data bus 108. In some implementations, the operating modes over an I2C control data bus may be referred to as a camera control interface (CCI) mode when used for camera applications.

According to one aspect, an improved mode of operation may be implemented over the multi-mode control data bus 108 to support camera operation. This improved mode of operation over an I2C control data bus may be referred to as a camera control interface extension (CCIe) mode when used for camera applications. In this example, the baseband processor 104 includes a master device 112 and the image sensor 106 includes a slave device 114, both the master device 112 and slave device 114 may operate according to the camera control interface extension (CCIe) mode over the control data bus 108 without affecting the proper operation of other legacy I2C devices coupled to the control data bus 108. According to one aspect, this improved mode over the control data bus 108 may be implemented without any bridge device between CCIe devices and any legacy I2C slave devices. An interrupt request (IRQ) line/bus 120 couples the slave devices 114 and 118 to the master device 112 allowing the slave devices to notify the master device 112 that the slave device 114 and 118 is in need of attention. In other words, the slave device requesting attention pulls the normally high IRQ line low (grounds the IRQ line 120), and the master device responds by first identifying which slave device requested the interrupt, and second, polling the slave for an IRQ status. For example, the status may be a request to perform a slave device to slave device communication.

Figure 2:
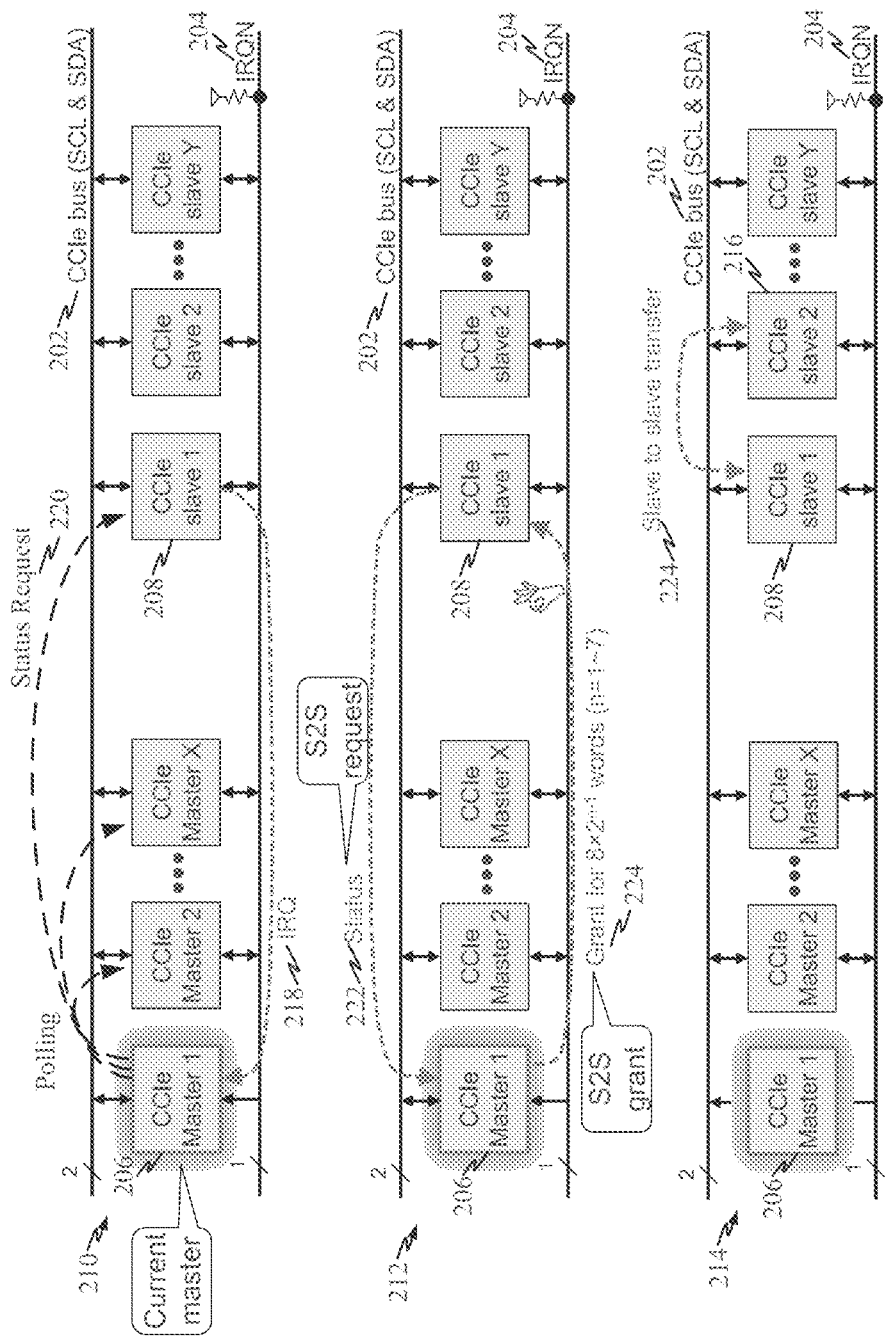
FIG. 2 illustrates an exemplary slave to slave communication process.

FIG. 2 illustrates an exemplary slave device to slave device communication process. Similar to FIG. 1, a device may include a shared control data bus 202 (e.g., CCIe bus) and a separate single-line interrupt bus 204 to which a plurality of devices may be coupled. In this example, an active/current master device 206 may control/manage access to the control data bus 202 by one or more other devices (e.g., non-active master devices and/or slave devices).

At a first stage 210, a first slave device 208 may wish to initiate communications with a second slave device 216. To do this, the first slave device may issue/send an interrupt signal 218 over the interrupt bus 204. The interrupt bus 204 may allow any device coupled to the interrupt bus 204 to unilaterally issue an interrupt signal over the interrupt bus 204 so long as no other device is already asserting an interrupt signal already. In response to sensing or receiving the interrupt request signal 218, the master device 206 may attempt to ascertain the requesting slave device (e.g., the device that issued the interrupt signal 218). This may be accomplished by the master device 206 polling or requesting 220 that each slave device to provide its status. In one example, this may be done by the master device 206 requesting 220 the status from each device coupled to control data bus 202 until the first slave device 208 that issued the interrupt signal 218 is identified.

At a second stage 212, in response to receiving the status request 220, the first slave device 208 may send its status 222 which would indicate that it issued the interrupt 218 and/or that it wishes to perform a slave device to slave device transfer/communication. Such slave device to slave device communication request may be for a direct data transfer (e.g., read or write operations) between the first slave device 208 and the second slave device 216 while bypassing the master device 206 (e.g., the data to be transferred is not managed or sent by the master device). In one example, the status 222 may be obtained by the master device 206 reading information within status registers for the first slave device 208.

Upon identifying the first slave device 208 as the issuer of the interrupt signal and ascertaining the desired service (e.g., use of the control data bus 202 for slave to slave communications), the master device 206 may grant such request by sending a grant indicator 224 via the interrupt bus 204. At that point, the first slave device 208 has been granted a limited permission to use the control data bus 202 for its own communications with another slave device 216. Note that because the master device 206 controls or manages use of the control data bus 202 by all devices coupled to the control data bus 202, there is no chance of conflicting use of the control data bus 202 by another device. In one example, the first slave device 208 is granted use of the control data bus 202 to send or receive a predetermined number of data words. The use of a slave device to slave device communication request is distinct from transferring control of the control data bus 202 to the first slave At a third stage 214, the first slave device 208 recognizes that the master device 206 has granted its request and may perform a slave to slave transfer or communication 224. The slave to slave transfer or communication 224 may read data from or send data to a second slave device 216. After the predetermined number of data words have been sent over the control data bus 202, the master device may regain control and use of the control data bus 202. The first slave device 208 stops transmitting over the control data bus 202 after sending and/or receiving the predetermined number of data words.

Figure 3:
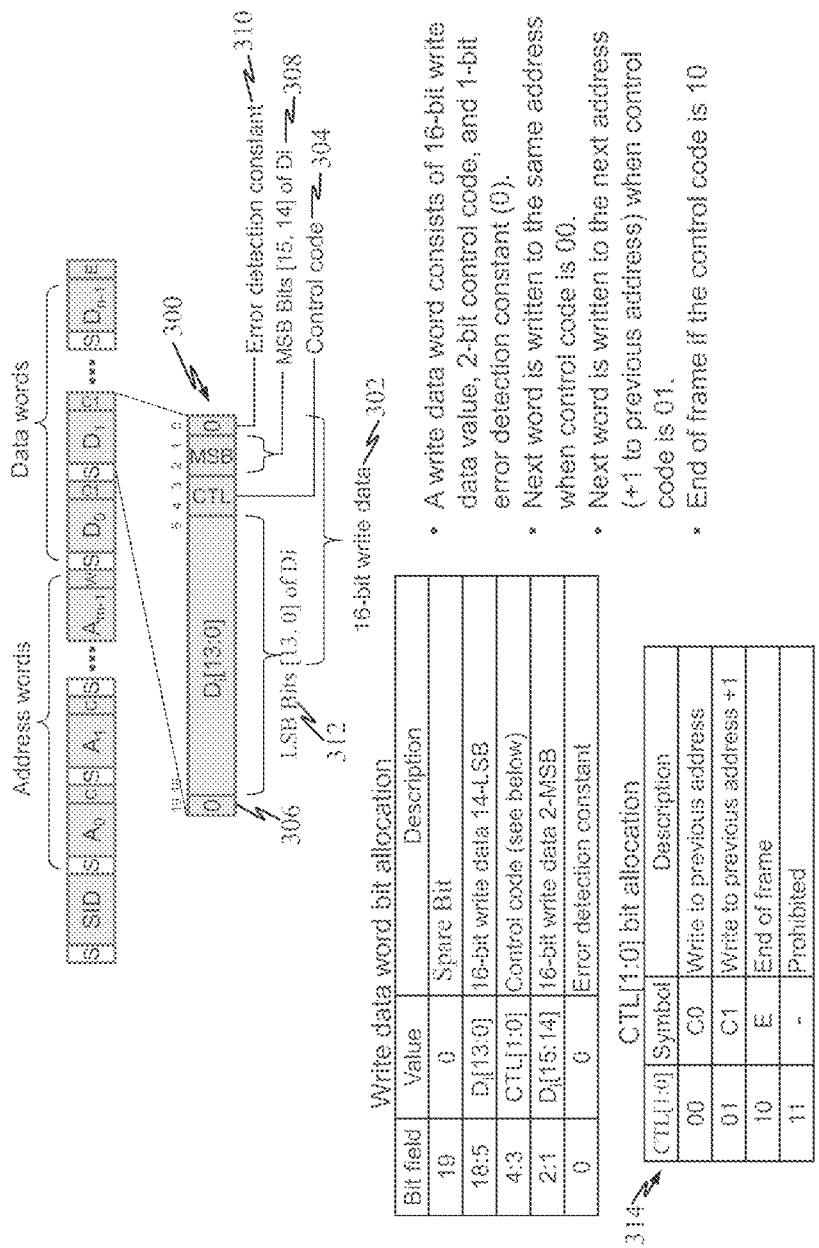
FIG. 3 conceptually illustrates an exemplary write data word.

Exemplary Communication Protocol Supporting Slave Device to Slave Device Communications FIG. 3 illustrates an exemplary write data word format. This illustrates that each data word 300 includes a 16-bit data portion 302, a 2-bit control code 304, a 1-bit error detection constant 310, and a spare bit 306. The 16-bit data portion 302 may be segmented into a 14-bit least significant bit portion 312 (located from bits 5 to 18 of the data word 300) and a 2-bit most significant bit portion 308 (located from bits 1 to 2 of the data word 300). The 1-bit error detection constant 310 may serve to detect an error on the data word 300 if the value is anything other than the expected constant (e.g., "0"). In one example, the write data word 300 may be a CCIe write data word.

A control code table 314 illustrates various possible values for the control code 304. In one example, multiple write data words can be sent sequentially. If the control code of the current write word is '00' (symbol C0), then the data is to be written to the previous address. If the control code of the current write word is '01' (symbol C0, then the data is to be written to the previous address+1. If the control code of the current write word is '10' (symbol E), this indicates an end of frame and the next word may be a slave device identifier (SID) or an Exit code.

The data word 300 may also have a spare bit 306 (e.g., bit 19, also referred to as $20^{th}$ bit) that may be used to transmit commands and other information between a master device and one or more slave devices. The spare bit 306 (e.g., bit 19) may be used to encode commands between devices coupled to the control data bus 108. A spare bit data region that may be defined by the use of this spare bit 306 (e.g., bit 19, also referred to as $20^{th}$ bit) is further illustrated and discussed in FIGS. 10, 11, and 12.

Figure 4:
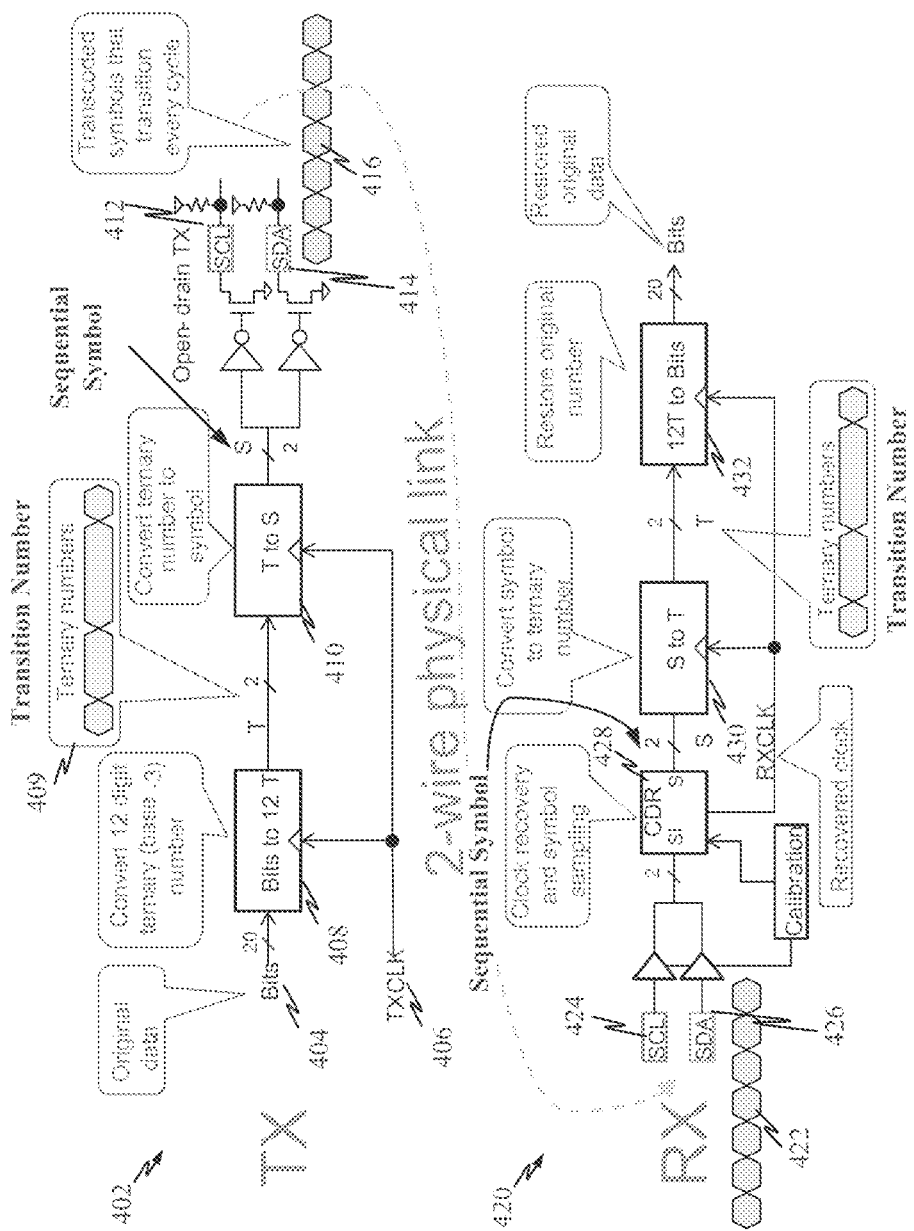
FIG. 4 is a block diagram illustrating an exemplary method for transcoding of data bits into sequential symbols at a transmitter to embed a clock signal within the sequential symbols.

FIG. 4 is a block diagram illustrating an exemplary method for transcoding of data bits into sequential symbols at a transmitter to embed a clock signal within the sequential symbols. At the transmitter 402, a sequence of data bits 404 are converted into a ternary (base 3) number (e.g., where individual digits of the ternary number are a "transition number"), and the ternary numbers are converted into sequential symbols which are transmitted over a control data bus that includes a clock line SCL 412 and a data line SDA 414.

In one example, an original 20-bits 404 of binary data is input to a bit-to-transition number converter block 408 to be converted to a 12-digits ternary number 409. Each digit of a 12-digits ternary number may represent a "transition number". Two consecutive digits of a transition number may be the same digit value. Each digit of a transition number is converted into a sequential symbol at a transition-to-symbol block 410 such that no two consecutive sequential symbols have the same value. Because a transition (e.g., change) is guaranteed at every sequential symbol, such sequential symbol transition may serve to embed a clock signal. Each sequential symbol 416 is then sent over a two wire physical link (e.g., I2C control data bus comprising a SCL line 412 and a SDA line 414).

At a receiver 420 the process is reversed to convert the sequential symbols back to bits and, in the process, a clock signal is extracted from the sequential symbol transition. The receiver 420 receives the sequential symbols 422 over the two wire physical link (e.g., an I2C control data bus comprising a SCL line 424 and a SDA line 426). The received sequential symbols 422 are input into a clock-data recovery (CDR) block 428 to recover a clock timing and sample the sequential symbols (S). A symbol-to-transition number converter block 430 then converts each sequential symbol to a transition number, where each transition number represents a digit of a ternary number. Then, a transition number-to-bits converter 432 converts twelve (12) transition numbers (i.e., a ternary number) to restore twenty (20) bits of original data from the 12 digit ternary number.

The technique illustrated herein may be used to increase the link rate of a control data bus 108 (FIG. 1) beyond what the I2C standard control data bus provides and is referred hereto as CCIe mode. In one example, a master node/device and/or a slave node/device coupled to the control data bus 108 may implement transmitters and/or receivers that embed a clock signal within sequential symbol changes/transitions (as illustrated in FIG. 5) in order to achieve higher bit rates over the same control data bus than is possible using a standard I2C control data bus.

Figure 5:
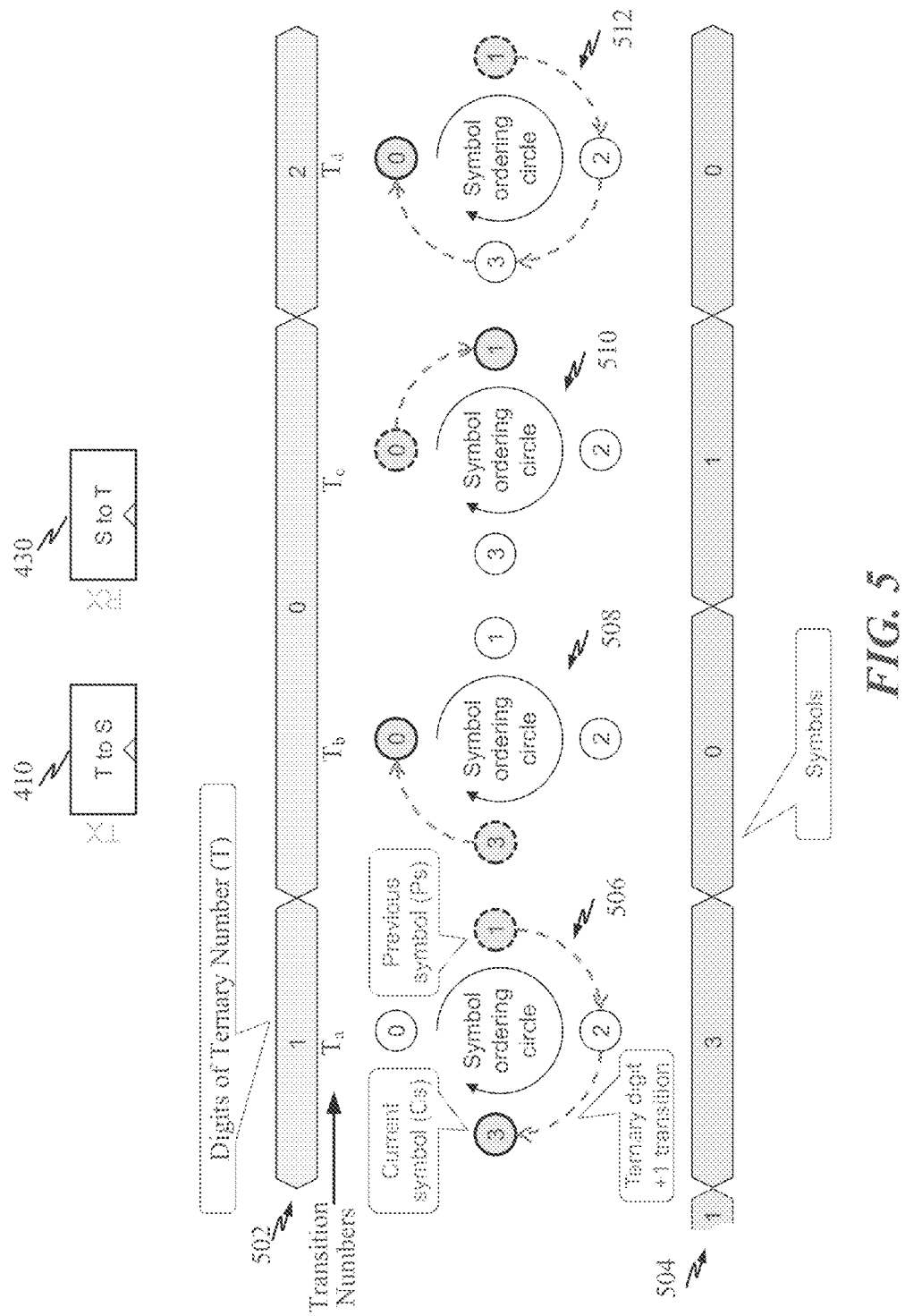
FIG. 5 illustrates an exemplary conversion between transition numbers and sequential symbols.

FIG. 5 illustrates an exemplary conversion between transition numbers 502 and sequential symbols 504. An individual digit of ternary number, base-3 number, also referred to as a transition number, can have one of the three (3) possible digits or states, 0, 1, or 2. While the same digit may appear in two consecutive digits of the ternary number, no two consecutive sequential symbols have the same value. The conversion between a transition number and a sequential symbol guarantees that the sequential symbol always changes (from sequential symbol to sequential symbol) even if consecutive transition numbers are the same.

In one example, the conversion function adds the transition number (e.g., digit of a ternary number) plus 1 to the previous raw sequential symbol value. If the addition results in a number larger than 3, it rolls over from 0, then the result becomes the state number or value for the current sequential symbol.

In a first cycle 506, a previous sequential symbol (Ps) is 1 when a first transition number ($T_a$) 1 is input, so the first transition number 1 plus 1 is added to the previous sequential symbol (Ps), and the resulting current sequential symbol (Cs) of 3 becomes the current sequential symbol that is sent to the physical link.

In a second (next) cycle 508, a second transition number ($T_b$) of 0 is input, and the second transition number 0 plus 1 is added to the previous sequential symbol (Ps) of 3. Since the result of the addition (0+1+3) equals 4, is larger than 3, the rolled over number 0 becomes the current sequential symbol (Cs).

In a third cycle 510, a third transition number ($T_c$) of 0 is input. The conversion logic adds the third transition number 0 plus 1 to the previous sequential symbol (Ps) 0 to generate current sequential symbol (Cs) 1.

In a fourth cycle 512, a fourth transition number ($T_d$) of 2 is input. The conversion logic adds the fourth transition number ($T_d$) 2 plus 1 to the previous symbol (Ps) 1 to generate current sequential symbol (Cs) 0 (since the result of the addition, 4, is larger than 3, the rolled over number 0 becomes the current sequential symbol).

Consequently, even if two consecutive ternary digits $T_b$ and $T_c$ have the same number, this conversion guarantees that two consecutive sequential symbols have different state values. Because of this conversion, the guaranteed sequential symbol change or transition in the sequence of symbols 504 may serve to embed a clock signal, thereby freeing the clock line SCL in an I2C control data bus for data transmissions.

Note that while this example of transition number to sequential number conversions adds a guaranteed number "1" to increment between consecutive sequential symbols, other values may be used in other implementations to guarantee a transition or change between sequential symbols.

Referring again to FIG. 4, at the receiver 420 the process illustrated in FIG. 5 is reversed to convert the sequential symbols back to bits and, in the process, a clock signal is extracted from the symbol transition. The receiver 420 receives sequential symbols 422 over the two wire physical link (e.g., I2C bus comprising a SCL line 424 and a SDA line 426). The received sequential symbols 422 are input into a clock-data recovery (CDR) block 428 to recover a clock timing and sample the transcoded symbols (S). A symbol-to-transition number converter block 430 then converts each sequential symbol to a transition number, i.e., which makes up a digit within a ternary number. Then, a transition number-to-bits converter 32 converts 12 transition numbers (i.e., a ternary number) to restore 20 bits of original data from the 12 digit ternary number.

Figure 6:
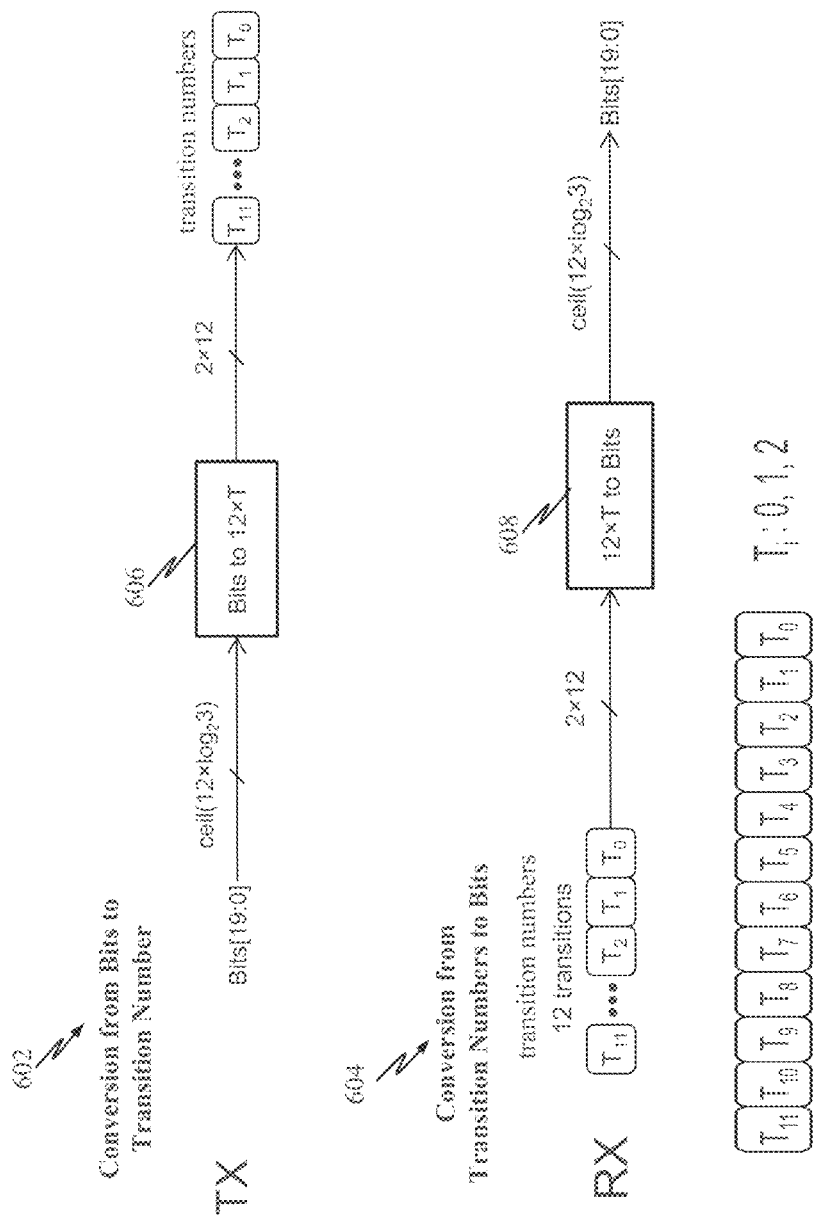
FIG. 6 illustrates an exemplary conversion from bits to transition numbers at a transmitter and then from transition numbers to bits at a receiver.

FIG. 6 illustrates an exemplary conversion from bits to transition numbers at a transmitter 602 and then from transition numbers to bits at a receiver 604. This example illustrates the transmission for a 2-wire system using 12 transition symbols. The transmitter 602 feeds binary information, Bits, into a "Bits to 12×T" converter 606 to generate 12 symbol transition numbers, T0 to T11. The receiver 604 receives 12 symbols transition numbers, T0 to T11, which are fed into a "12×T to Bits" converter 608 to retrieve the binary information (Bits). If there are r possible symbol transition states per one T, T0 to T11, 12 transitions can send $r^{12}$ different states. For a 2-wire bus, $r=2^2-1$. Consequently, transitions T0 ... T11 contain data that can have $(2^2-1)^{12}$ different states. Consequently, r=4−1=3 and the number of states=(4−1)^12=531441.

In this example for a 2-wire system using 12 symbol transition numbers, it may be assumed that the possible symbol transitions per one T, r is 3 ($=2^2-1$). If the number of symbols in a group is 12, a 12-digit ternary number (base-3 number): T11, T10, ..., T2, T1, T0, where each Ti: 0, 1, 2, may be used. For example, for {T11, T10, ... T2, T1, T0}={2, 1, 0, 0, 1, 1, 0, 1, 0, 1, 2, 1}, the ternary number is:

$$2100\_1101\_0121_3 \text{ (Ternary number)} =$$
$$2\times 3^{11} + 1\times 3^{10} + 0\times 3^9 + 0\times 3^8 + 1\times 3^7 + 1\times 3^6 + 0\times 3^5 +$$
$$1\times 3^4 + 0\times 3^3 + 1\times 3^2 + 2\times 3^1 + 1\times 3^0 = 416356 \text{ (0x65A64)}.$$

In this manner, 12 transitions numbers may be converted into a number. Note that the ternary number $2100\_1101\_0121_3$ may be used as the transition number, for example, in FIG. 4, so that each transition number (e.g., digit of a ternary number) may be mapped to a sequential symbol and vice versa.

The example illustrated in FIG. 6 for a 2-wire system and 12 symbol transition numbers may be generalized to a n-wire system and m symbol transition numbers. If there are r possible symbol transition states per one T, T0 to Tm−1, m transitions can send $r^m$ different states, i.e., $r=2^n-1$. Consequently, transitions numbers T0 ... Tm−1 contain data that can have $(2^n-1)^m$ different states (e.g., sequential numbers).

FIG. 7 illustrates a general example of converting a ternary number (base-3 number) to a binary number, where each T in {T11, T10, ... T2, T1, T0} is a transition number.

FIG. 8 illustrates an exemplary method for converting a binary number (bits) to a 12 digit ternary number (base-3 number). Each digit of the ternary number can be calculated by dividing the remainder (result of a modulo operation) from a higher digit calculation with 3 to the power of the digit number, discarding decimal points numbers.

FIG. 9 illustrates an example of one possible implementation of the division and the modulo operations of FIG. 8, which may be synthesizable by any commercial synthesis tools.

Figure 10:
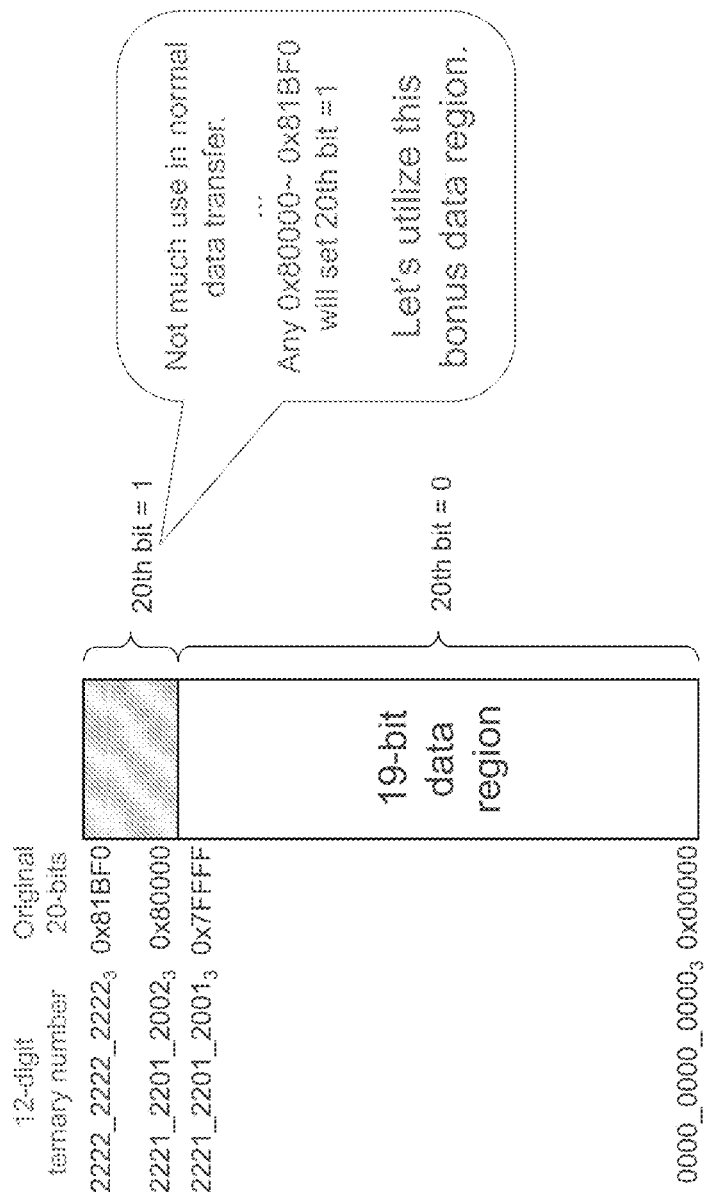
FIG. 10 illustrates an example of a 20-bit region comprising a 19 bit data region (e.g., bits 0-18) and an additional 20$^{th}$ bit region (e.g., bit 19).

FIG. 10 conceptually illustrates a bit 19 (the 20th bit or "spare bit" 306 in FIG. 3) is mostly unused in the CCIe protocol and may be used to enable slave device to slave device communications. More specifically, FIG. 10 illustrates the bit 19 (i.e., the 20th bit when the bit count starts at the first bit being bit 0). In other words, as is typical in the computer sciences, counting bit wise begins at zero, and bit 19 is the 20th bit. Here, the bits 0-18 are represented within the ternary number range of 0000_0000_0000$_3$ to 2221_2201_2001$_3$. The ternary numbers in the range of 2221_2201_2002$_3$ to 2222_2222_2222$_3$ are unused. Consequently, the ternary number range 2221_2201_2002$_3$ to 2222_2222_2222$_3$ may be used to represent bit 19 (i.e., 20th bit). In other words, 2221_2201_2002$_3$ ternary is 10,000,000,000,000,000,000 binary (0x80000 hexadecimal) and 2222_2222_2222$_3$ ternary (0x81BF0) is the largest 12 digit ternary number possible. In one implementation of slave device to slave device communication, the 20th bit (bit 19) is utilized as described herein.

FIG. 11 conceptually illustrates a CCIe Bit 19 mapping protocol for ternary numbers 0000_0000_0000$_3$ to 2222_2222_2222$_3$. Note that different types of commands may be encoded within the bit 19 region (e.g., 20th Bit).

FIG. 12 illustrates an exemplary mapping of a portion of the Bit 19 mapping of FIG. 11.

Figure 13:
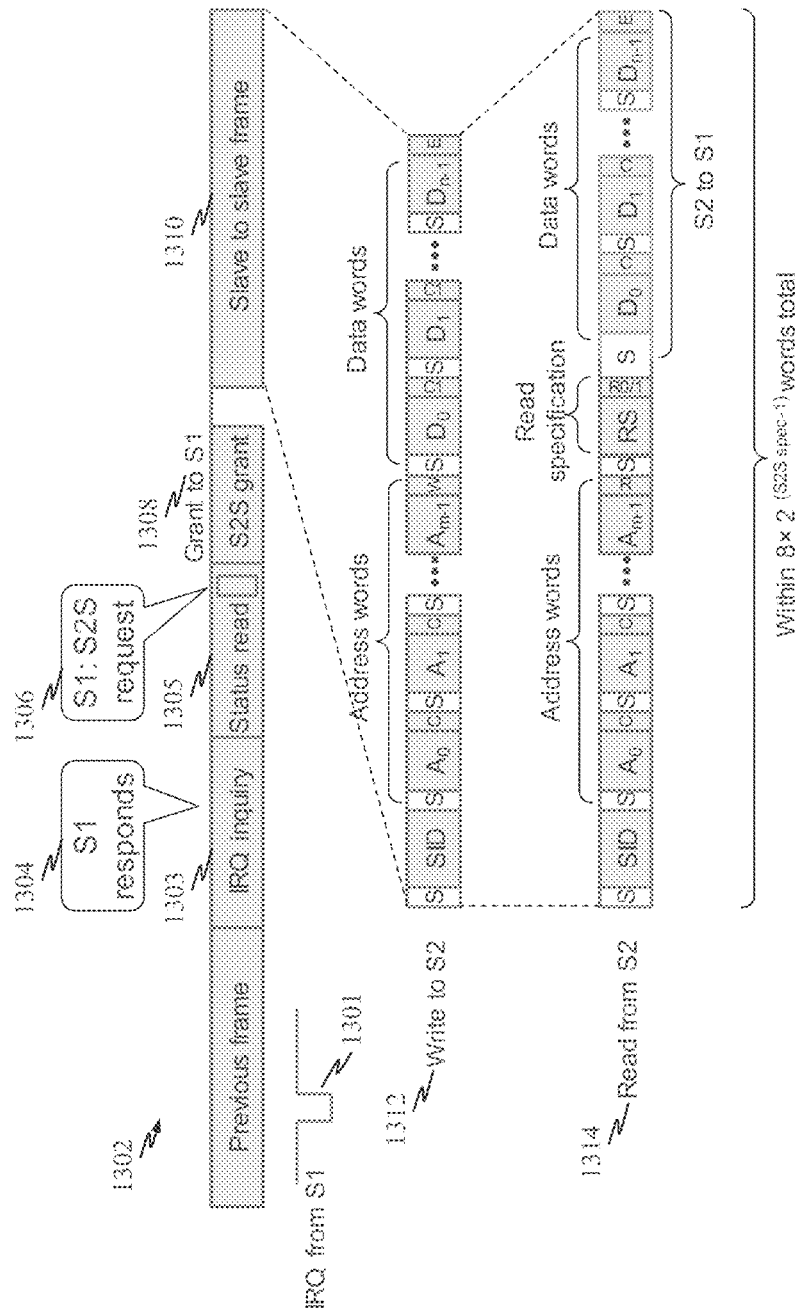
FIG. 13 conceptually illustrates a sequence of transmissions over a control data bus that may be performed for a slave device to slave device communication.

FIG. 13 conceptually illustrates a sequence of transmissions over a control data bus that may be performed for a slave device to slave device communication. In this example, the slave device to slave device communication protocol utilizes the range from 2222_2112_1122$_3$ to 2222_2202_2120$_3$. The slave device may send an interrupt signal to the master device over the separate interrupt bus/line. In response to such interrupt signal 1301, the master device may initiate/send an IRQ inquiry 1303 over the control data bus which causes the requesting slave device (S1) to respond 1304. The master device may then read the status 1305 of the requesting slave device (S1) in which a slave-to-slave communication request 1306 is indicated. This slave-to-slave communication request 1306 may include an upper limit (max limit) of words for the requested transmission to another slave device. The number of words may not just be the data portion of the message but rather may include the entire number of words to be transmitted between slave devices, including all overhead and/or envelope information such as a slave identifier (SID), a cyclic redundancy check or checksum (CRC) and/or synchronization (SYNC) information. The master device, after granting 1308 a slave device's request then monitors the slave device's transmissions 1310 and after an end code is sent from the transmitting slave device, the master device resumes control over the control data bus. In other words, the master device monitors the control data bus to detect an end of the granted access, after notifying the slave device that sent the request, that the request is granted. Note that during this slave to slave transmission frame 1310, the requesting slave device may send write commands 1312 and/or read commands 1314 to another slave device.

Figure 14:
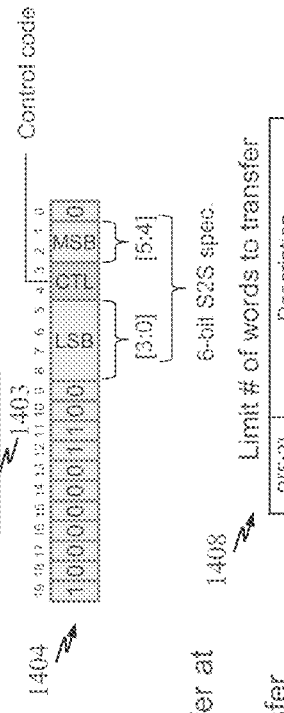
FIG. 14 conceptually illustrates an exemplary slave to slave transfer request.

FIG. 14 conceptually illustrates an exemplary slave to slave transfer request. This exemplary slave to slave transfer request 1403 may be embedded with a portion 1402 of the bit 19 mapping illustrated in FIGS. 11 and 12 (e.g., utilizes the range from 2222_2112_1122$_3$ to 2222_2202_2120$_3$). One example of the slave to slave transfer request 1403 is defined by a first bit sequence 1404 in conjunction with two tables 1406 and 1408. This slave to slave transfer request 1403 may include the number of words 1408 to be transmitted over the control data bus during the slave to slave transfer.

Figure 15:
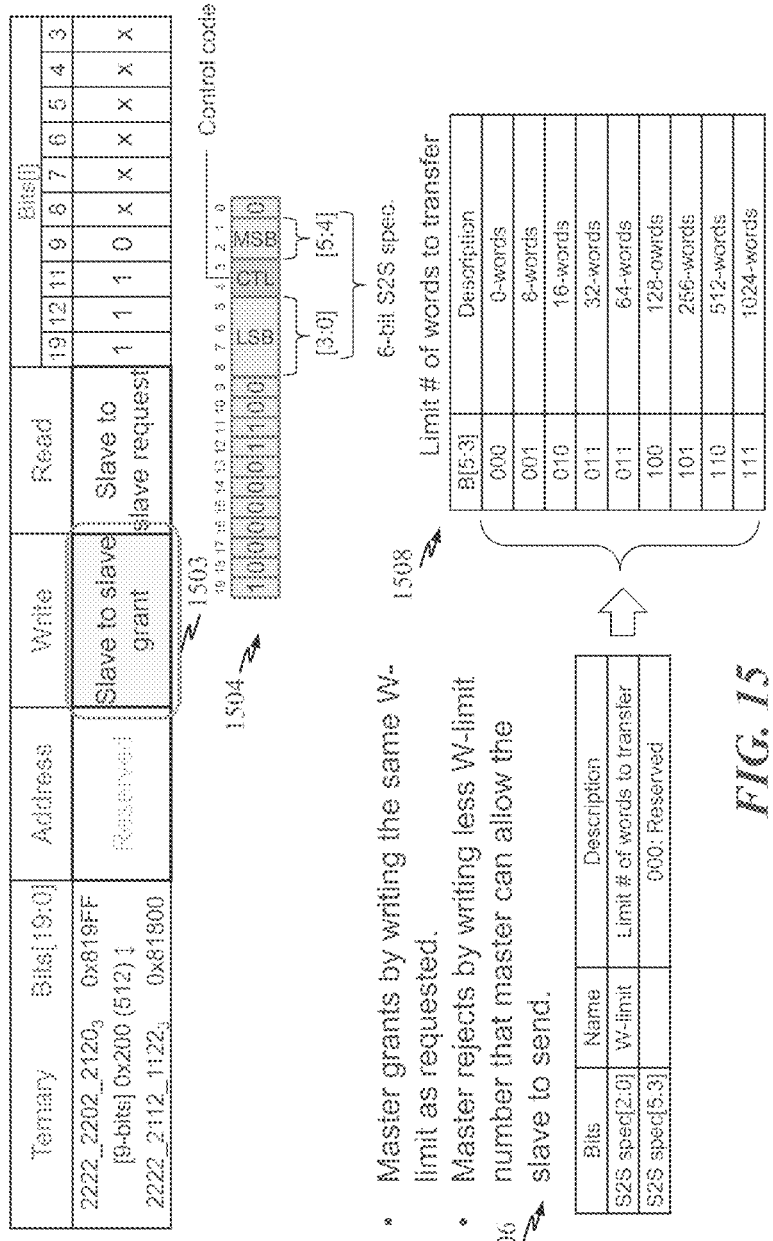
FIG. 15 conceptually illustrates a grant command for a slave device to slave device communication protocol.

FIG. 15 conceptually illustrates a grant command for a slave device to slave device communication protocol. In this example, the slave device to slave device communication protocol 1502 utilizes the range from 2222_2112_1122$_3$ to 2222_2202_2120$_3$ in sending request grants and/or denials. The master device grants the slave device to slave device communication request by returning to the requesting slave device a message including the same word limit number in the slave device to slave device communication request originally sent from the slave device to the master device. Alternatively, the master device returns a word limit number smaller than the requested number which the slave device understands to be a denial of the original request and a furnishing of a new word limit. When the new (i.e., current) word limit is zero, the slave device knows that slave device to slave device communication is currently disabled and waits a pre-programmed amount of time before making a second request. Else, if the returned current word limit is non-zero, the slave device then breaks the original too long message into a plurality of messages no larger than the returned current word limit. Additionally, in some embodiments, one or more slave devices may have a sleep mode to save energy, and when an intended recipient of a slave device to slave device communication is in the sleep mode, the master device may wake up the sleeping slave device prior to granting a requesting slave device's communication request. Alternatively, the master device may first deny the requesting slave device's communication request by sending a current word limit of zero and then wakes up the sleeping slave. After a pre-programmed period of time, the denied slave device initiates a second request that the master device may now grant.

One example of the slave to slave transfer grant 1503 is defined by a first bit sequence 1504 in conjunction with two tables 1506 and 1508. This slave to slave transfer grant 1503 may include the number of words 1508 allowed to be transmitted over the control data bus during the slave to slave transfer.

Figure 16:
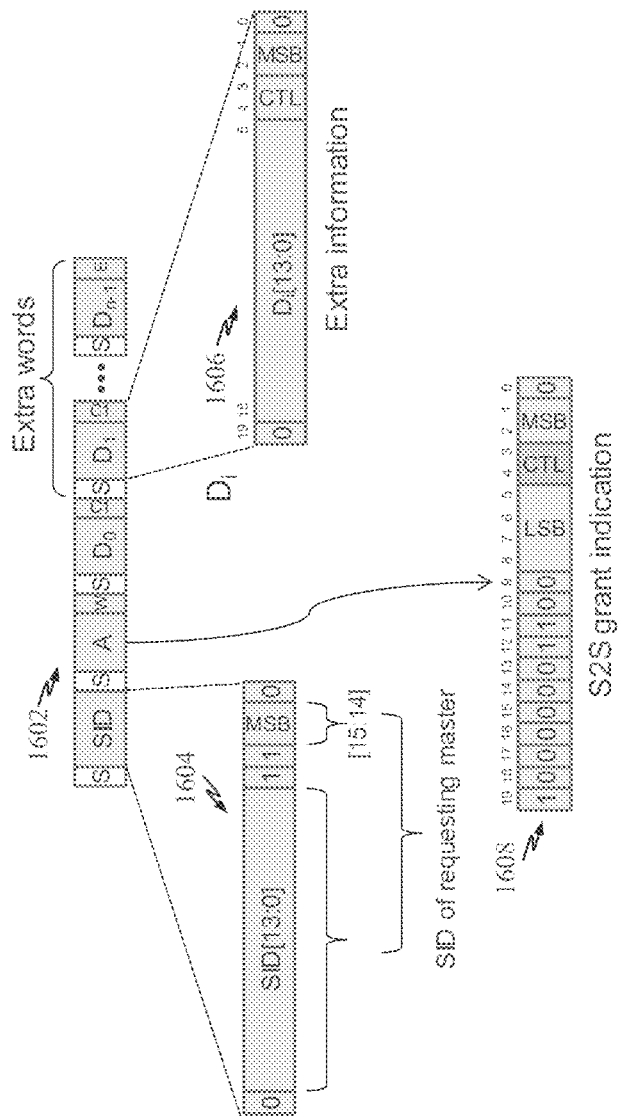
FIG. 16 conceptually illustrates details of a grant command for a slave device to slave device transfer.

FIG. 16 conceptually illustrates details of a grant command for a slave device to slave device transfer. In this example, the master device may send a frame 1602 that includes the requesting slave device's identifier (SID), and extra words 1606. As part of the "address" field, the master device may provide the slave device to slave device grant 1608.

Exemplary Master Device and Method Operational Therein

Figure 17:
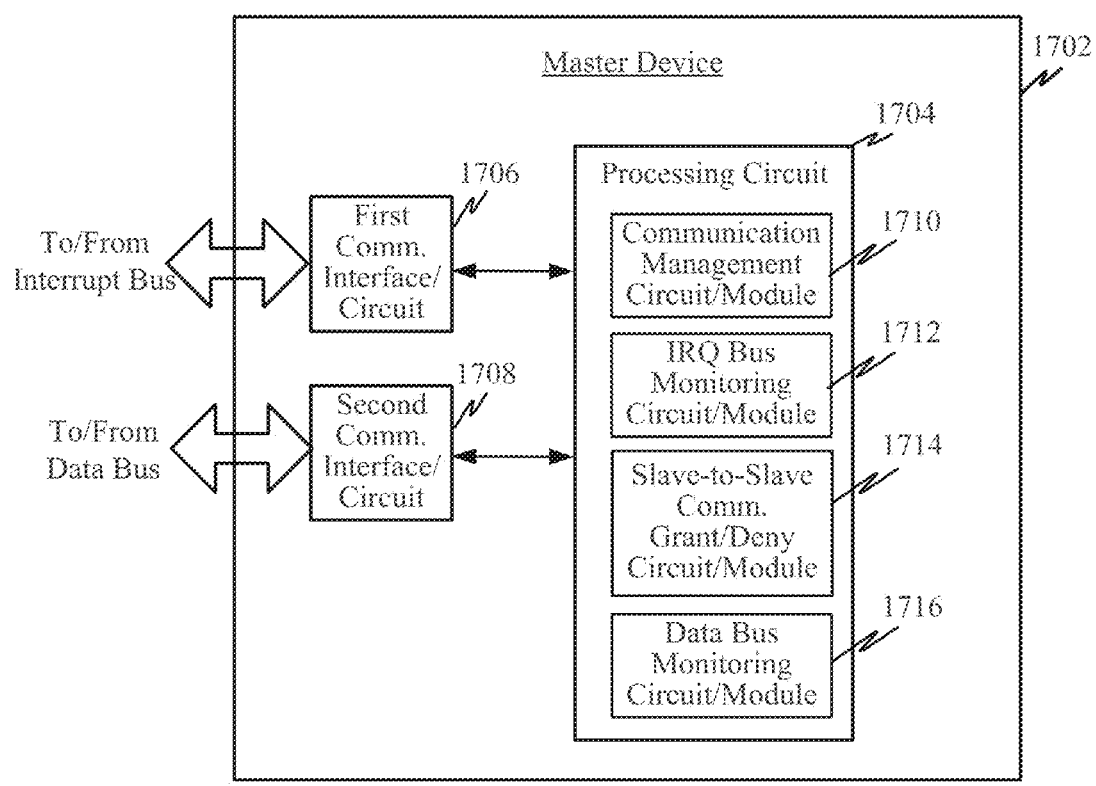
FIG. 17 is a block diagram illustrating an exemplary master device adapted for slave device to slave device communication.

FIG. 17 is a block diagram illustrating an exemplary master device adapted for slave device to slave device communication. The master device 1702 may include a first communication interface/circuit 1706, a second communication interface/circuit 1708, and/or a processing circuit 1704. The first communication interface/circuit 1706 may serve to couple to a single line interrupt request (IRQ) bus to which a plurality of other devices may be coupled. The second communication interface/circuit 1708 may serve to couple to a control data bus to which the plurality of other devices may also be coupled.

The processing circuit 1704 may include various sub-circuits and/or modules to carry out one or more functions described herein. For example, a communication management circuit/module 1710 may be adapted to manage communications over the data bus for all devices coupled to the control data bus based on interrupt signals asserted over the IRQ bus. An IRQ bus monitoring circuit/module 1712 may be adapted to monitor the IRQ bus to ascertain when an IRQ signal has been asserted (e.g., by a slave device). A slave-to-slave communication grant/deny circuit/module 1714 may be adapted to respond (e.g., grant or deny) to a request by a slave device to communicate directly with another slave device over the control data bus. A data bus monitoring circuit/module 1716 may be adapted to allow the master device to monitor the control data bus to ascertain when the slave-to-slave communications have ended.

Figure 18:
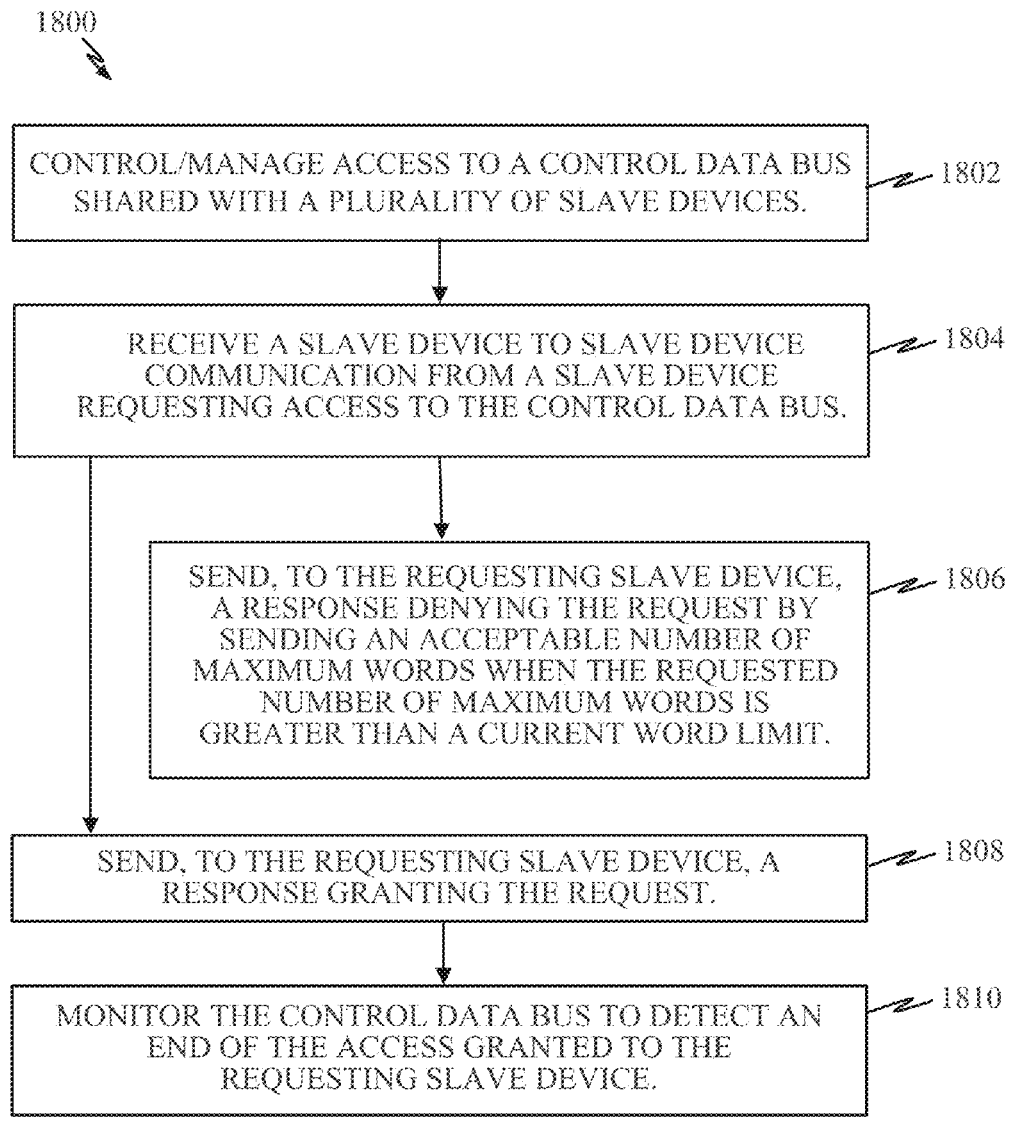
FIG. 18 illustrates a method operational on a master device to facilitate slave device to slave device communication.

FIG. 18 illustrates a method 1800 operational on a master device to facilitate slave device to slave device communication. The method 1800 includes having a master device control/manage access to a control data bus shared with a plurality of slave devices 1802. The master device may receive a slave device to slave device communication/transfer request from a slave device requesting access to the control data bus 1804. The slave device to slave device communication/transfer request may include a maximum number of words that the requesting slave device wishes to transmit over the control date bus. In response to such request, the master device may send, to the requesting slave device, a response denying the request by sending an acceptable maximum number of words when a requested maximum number of words is greater than a current maximum word limit 1806. For instance, the acceptable number of words may be equal to the current maximum word limit (maintained by the master device) and/or it may be a number less than the requested maximum number of words. Alternatively, the master device may send, to the requesting slave device, a response granting the request 1808. Moreover, the master device may monitor the control data bus to detect an end of the granted access to the requesting slave device 1810. Upon detection of an end of slave device to slave device communications over the shared control bus is detected, the master device may regain control of the control data bus.

In one example, the response from the master device grants the request by including a word limit number in the response that is equal to or greater than a maximum number of words specified in the request. That is, if the response includes a word limit number that matches the requested maximum number of words specified by the requesting slave device or is greater than the requested maximum number of words, the requesting slave device may recognize this as a grant of the request.

According to another aspect, if the master device does not support slave device to slave device communications, the master device respond to the request with a word limit number of zero (0) in its response. Hence, if a master device may be required (e.g., by a protocol standard) to reply to the slave device to slave device communication request, but it may deny the request by including a word limit number of zero (0). For this reason, it may be advisable for master devices that support slave device to slave device communications to reply with a non-zero word limit number in its response.

According to one aspect, if the master device denies the slave device to slave device communication request, the slave device may wait some amount of time and then resends the same slave device to slave device communication request (e.g., same desired number of words to be transferred) to the master device over the control data bus. Note that the original denial may have been due to a busy control data bus, so retrying at a later time may result in the request being granted. Additionally, the slave device may retry sending the same request several times before giving up.

According to another aspect, if the master device denies the slave device to slave device communication request, the slave device may resend the request but with a lower maximum number of words to be transferred by the requesting slave device over the control data bus. In some implementations, the slave device may breakup a data transfer that is larger than the maximum number of words permitted by the master device into multiple slave device to slave device communication requests.

In an alternative approach, if the master device denies the slave device to slave device communication request, but the slave device cannot breakup the data transfer into multiple portions, the slave device may request the master device to take over the data transfer between the requesting slave device and another slave device.

Exemplary Slave Device and Method Operational Therein

Figure 19:
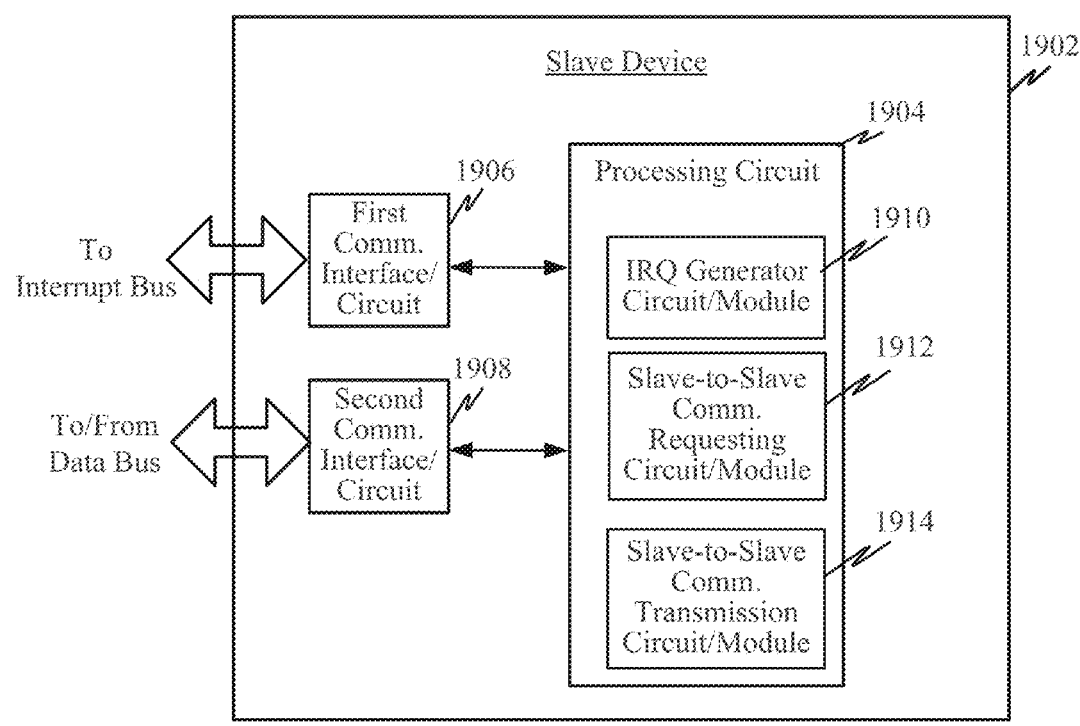
FIG. 19 is a block diagram illustrating an exemplary slave device adapted for slave device to slave device communication.

FIG. 19 is a block diagram illustrating an exemplary slave device adapted to perform slave device to slave device communication. The slave device 1902 may include a first communication interface/circuit 1906, a second communication interface/circuit 1908, and/or a processing circuit 1904. The first communication interface/circuit 1906 may serve to couple to a single line interrupt request (IRQ) bus to which a plurality of other devices may be coupled. The second communication interface/circuit 1908 may serve to couple to a control data bus to which the plurality of other devices may also be coupled.

The processing circuit 1904 may include various sub-circuits and/or modules to carry out one or more functions described herein. For example, an interrupt (IRQ) generator circuit/module 1910 may be adapted to generate an interrupt request over the interrupt bus. A slave-to-slave communication requesting circuit/module 1912 may be adapted to request use of the control data bus from a master device in order to perform slave-to-slave communications directly with another slave device. A slave-to-slave communication transmission circuit/module 1914 may be adapted to send slave-to-slave communications over the control data bus.

Figure 20:
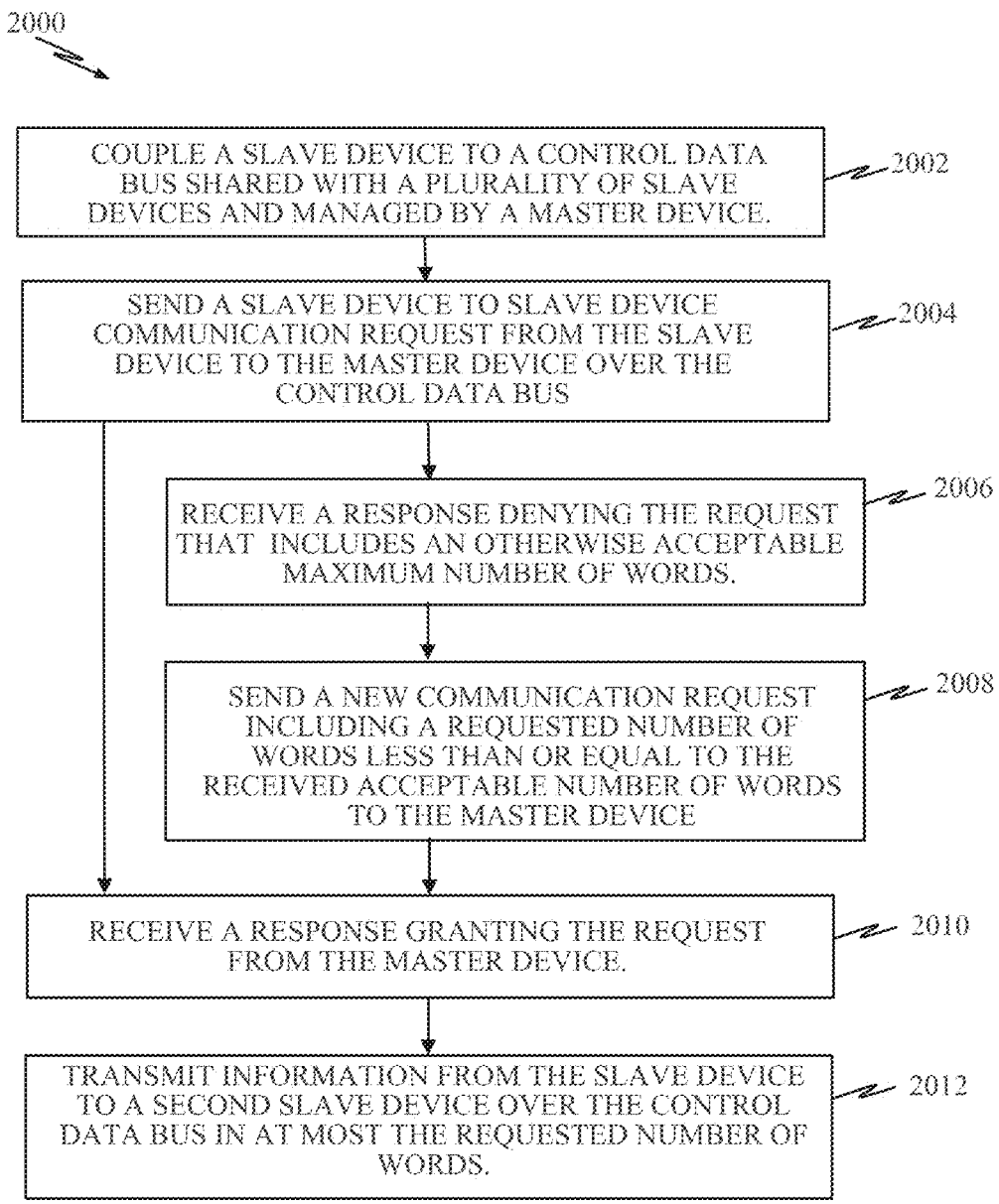
FIG. 20 illustrates a method operational on a slave device to perform slave device to slave device communication.

FIG. 20 illustrates a method 2000 operational on a slave device to facilitate slave device to slave device communication. The method 2000 includes coupling the slave device to a control data bus shared with a plurality of slave device and managed by a master device 2002. The slave device may send a slave device to slave device communication request to the master device over the control data bus 2004. In response to the request, the slave device may receive a response denying the request that includes an otherwise acceptable maximum number of words from the master device 2006. If the request is initially denied, the slave device may simply wait an amount of time and resend the same initial request. Alternatively, the slave device may send a new slave device to slave device communication request including a requested maximum number of words less than or equal to the received acceptable maximum number of words to the master device 2008.

The slave device may receive a response granting the request from the master device 2010. Upon receiving the grant response from the master device, the slave device may transmit information to a second slave device over the control data bus in, at most, the request number of words 2012.

According to one aspect, if the master device denies the slave device to slave device communication request, the slave device may wait some amount of time and then resends the same slave device to slave device communication request (e.g., same desired number of words to be transferred) to the master device over the control data bus. Note that the original denial may have been due to a busy control data bus, so retrying at a later time may result in the request being granted. Additionally, the slave device may retry sending the same request several times before giving up.

According to another aspect, if the master device denies the slave device to slave device communication request, the slave device may resend the request but with a lower maximum number of words to be transferred by the requesting slave device over the control data bus. In some implementations, the slave device may breakup a data transfer that is larger than the maximum number of words permitted by the master device into multiple slave device to slave device communication requests.

In an alternative approach, if the master device denies the slave device to slave device communication request, but the slave device cannot break up the data transfer into multiple portions, the slave device may request the master device to take over the data transfer between the requesting slave device and another slave device.

In yet another approach, if the master device denies the slave device to slave device communication request and the requesting slave device is capable of operating in either master mode or slave mode, the requesting slave device may request to become the master of the shared control data bus in order to transfer the desired number of words.

One or more of the components, steps, features, and/or functions illustrated in the Figures may be rearranged and/or combined into a single component, step, feature, or function or embodied in several components, steps, or functions. Additional elements, components, steps, and/or functions may also be added without departing from novel features disclosed herein. The apparatus, devices, and/or components illustrated in the Figures may be configured to perform one or more of the methods, features, or steps described in the Figures. The novel algorithms described herein may also be efficiently implemented in software and/or embedded in hardware.

In addition, it is noted that the embodiments may be described as a process that is depicted as a flowchart, a flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed. A process may correspond to a method, a function, a procedure, a subroutine, a subprogram, etc. When a process corresponds to a function, its termination corresponds to a return of the function to the calling function or the main function.

Moreover, a storage medium may represent one or more devices for storing data, including read-only memory (ROM), random access memory (RAM), magnetic disk storage mediums, optical storage mediums, flash memory devices, and/or other machine-readable mediums for storing information. The term "machine readable medium" includes, but is not limited to portable or fixed storage devices, optical storage devices, wireless channels and various other mediums capable of storing, containing, or carrying instruction(s) and/or data.

Furthermore, embodiments may be implemented by hardware, software, firmware, middleware, microcode, or any combination thereof. When implemented in software, firmware, middleware, or microcode, the program code or code segments to perform the necessary tasks may be stored in a machine-readable medium such as a storage medium or other storage(s). A processor may perform the necessary tasks. A code segment may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

The various illustrative logical blocks, modules, circuits, elements, and/or components described in connection with the examples disclosed herein may be implemented or performed with a general purpose processor, a digital signal processor (DSP), an application specific integrated circuit (ASIC), a field programmable gate array (FPGA) or other programmable logic component, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing components, e.g., a combination of a DSP and a microprocessor, a number of microprocessors, one or more microprocessors in conjunction with a DSP core, or any other such configuration.

The methods or algorithms described in connection with the examples disclosed herein may be embodied directly in hardware, in a software module executable by a processor, or in a combination of both, in the form of processing unit, programming instructions, or other directions, and may be contained in a single device or distributed across multiple devices. A software module may reside in RAM memory, flash memory, ROM memory, EPROM memory, EEPROM memory, registers, hard disk, a removable disk, a CD-ROM, or any other form of storage medium known in the art. A storage medium may be coupled to the processor such that the processor can read information from, and write information to, the storage medium. In the alternative, the storage medium may be integral to the processor.

Those of skill in the art would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system.

The various features of the invention described herein can be implemented in different systems without departing from the invention. It should be noted that the foregoing embodiments are merely examples and are not to be construed as limiting the invention. The description of the embodiments is intended to be illustrative, and not to limit the scope of the claims. As such, the present teachings can be readily applied to other types of apparatuses and many alternatives, modifications, and variations will be apparent to those skilled in the art.

What is claimed is:

1. A master device, comprising:
a bus interface circuit to couple to a control data bus shared with a plurality of slave devices; and
a processing circuit coupled to the bus interface circuit and configured to:
control access to the control data bus by the plurality of slave devices;
receive a slave device to slave device communication request from a slave device requesting access to the control data bus, wherein the slave device to slave device communication request is for a direct data transfer between the slave device and another slave device of the plurality of slave devices while bypassing the master device, and wherein the slave device to slave device communication request includes a requested maximum number of words to be transferred from the requesting slave device to another slave device over the control data bus; and
send, to the requesting slave device, a response granting the request, wherein the response grants the request by including a word limit number in the response that is equal to or greater than a maximum number of words specified in the request.

2. The master device of claim 1, wherein the slave device to slave device communication request includes a requested number of words to be transferred by the requesting slave device to another slave device.

3. The master device of claim 1, wherein the processing circuit is further configured to:
monitor the control data bus to detect an end of slave device to slave device communications; and
regain control of the control data bus after an end of slave device to slave device communications is detected.

4. A master device, comprising:
a bus interface circuit to couple to a control data bus shared with a plurality of slave devices; and
a processing circuit coupled to the bus interface circuit and configured to:
control access to the control data bus by the plurality of slave devices;
receive a slave device to slave device communication request from a slave device requesting access to the control data bus, wherein the slave device to slave device communication request is for a direct data transfer between the slave device and another slave device of the plurality of slave devices while bypassing the master device, wherein the slave device to slave device communication request includes a requested maximum number of words to be transferred from the requesting slave device to another slave device over the control data bus; and
send, to the requesting slave device, a response denying the request, wherein the slave device to slave device communication request is denied if the requested maximum number of words is greater than a current word limit of the master device.

5. The master device of claim 4, wherein the processing circuit is further configured to:
send, to the requesting slave device, a response denying the request by sending an acceptable number of words when a requested maximum number of words provided by the requesting slave device is greater than a current word limit.

6. The master device of claim 4, wherein the master device sends the response denying the request if the master device does not support slave device to slave device communications.

7. A method operational by a master device, comprising:
controlling access to a control data bus shared with a plurality of slave devices;
receiving a slave device to slave device communication request from a slave device requesting access to the control data bus, wherein the slave device to slave device communication request is for a direct data transfer between the slave device and another slave device of the plurality of slave devices while bypassing the master device, wherein the slave device to slave device communication request includes a requested maximum number of words to be transferred from the requesting slave device to another slave device over the control data bus; and
sending, to the requesting slave device, a response denying the request, wherein the response denying the request includes an acceptable number of words that is less than the requested maximum number of words.

8. The method of claim 7, further comprising:
sending, to the requesting slave device, a response granting the request.

9. The method of claim 8, further comprising:
monitoring the control data bus to detect an end of slave device to slave device communications; and
regaining control of the control data bus after an end of slave device to slave device communications is detected.

10. The method of claim 7, further comprising:
receiving a request from the requesting slave device to have the master device transfer a certain amount of information between the requesting slave device and the another slave device; and
transferring data between the requested information between the requesting slave device and the another slave device.

11. A slave device, comprising:
a bus interface circuit to couple to a control data bus shared with a plurality of slave devices and at least one master device;
a processing circuit coupled to the bus interface circuit and configured to:
send a slave device to slave device communication request from the slave device to the master device over the control data bus, wherein the slave device to slave device communication request is for a direct data transfer between the slave device and another slave device of the plurality of slave devices while bypassing the master device, wherein the communication request indicates a requested maximum number of words to be transmitted by the slave device to another slave device over the control data bus; and
receive a response denying the request from the master device, wherein the response indicates an acceptable maximum number of words from the master device.

12. The slave device of claim 11, wherein the processing circuit is further configured to:
send a new slave device to slave device communication request to the master device, wherein the new slave device to slave device communication request indicates a new requested maximum number of words that is less than or equal to the acceptable maximum number of words indicated in the response.

13. The slave device of claim 11, wherein the processing circuit is further configured to:
  send a new request to have the master device transfer a certain amount of information between the requesting slave device and the another slave device.

14. The slave device of claim 11, wherein the processing circuit is further configured to either:
  resend the same slave device to slave device communication request, indicating the same maximum number of words, to the master device at a later time; or
  send a new slave device to slave device communication request indicating a second word limit that is less than the previously requested maximum word limit but greater than the acceptable number of words indicated by the master device in its denial of the initial request.

15. The slave device of claim 11, wherein the processing circuit is further configured to:
  send a master request to the master device to transfer control of the control data bus to the requesting slave device;
  operate as new master of the control data bus if the master request is granted by the master device; and
  send a desired amount of data words to another slave device.

16. The slave device of claim 11, wherein the processing circuit is further configured to:
  receive a response granting the request; and
  send a slave device to slave device communication to the control data bus.

17. The slave device of claim 11, wherein the slave device to slave device communication is limited to an acceptable number of words approved by the master device.

18. A method operational on a slave device, comprising:
  coupling the slave device to a control data bus shared with a plurality of slave devices and at least one master device;
  sending a slave device to slave device communication request from the slave device to the master device over the control data bus, wherein the slave device to slave device communication request is for a direct data transfer between the slave device and another slave device of the plurality of slave devices while bypassing the master device, wherein the slave device to slave device communication request includes a requested number of words to be transferred by the slave device to another device over the control data bus; and
  receiving from the master device, a response granting the request, wherein the response grants the request by including a word limit number in the response that is equal to or greater than the requested number of words included in the slave device to slave device communication request.

19. The method of claim 18, further comprising:
  sending a slave device to slave device communication to the control data bus.

20. The method of claim 19, wherein the slave device to slave device communication is limited to the word limit number included in the response.

\* \* \* \* \*